US010326742B1

(12) United States Patent
Iverson et al.

(10) Patent No.: US 10,326,742 B1
(45) Date of Patent: Jun. 18, 2019

(54) CRYPTOGRAPHICALLY ENFORCED DATA EXCHANGE

(71) Applicant: JOURNERA, INC., Chicago, IL (US)

(72) Inventors: Kevin George Iverson, Oak Park, IL (US); Steven Mark Hoffman, Chicago, IL (US); Justin Grudzien, Woodridge, IL (US); John Sokel, Pullman, MI (US)

(73) Assignee: JOURNERA, INC., Chicago, IL (US)

( * ) Notice: Subject to any disclaimer, the term of this patent is extended or adjusted under 35 U.S.C. 154(b) by 0 days.

(21) Appl. No.: 15/956,143

(22) Filed: Apr. 18, 2018

Related U.S. Application Data

(60) Provisional application No. 62/647,011, filed on Mar. 23, 2018.

(51) Int. Cl.
*H04L 9/06* (2006.01)
*G06Q 10/02* (2012.01)
*H04L 29/06* (2006.01)

(52) U.S. Cl.
CPC ......... *H04L 63/0428* (2013.01); *G06Q 10/02* (2013.01); *H04L 9/0643* (2013.01)

(58) Field of Classification Search
CPC ........ G06Q 10/02; G06Q 50/14; G06Q 50/12; G06Q 30/06; G06Q 30/0601; G06Q 30/02; G06Q 30/0609; G06Q 30/0613; G06Q 30/0253; G06Q 30/0611; G06Q 30/0605; G06Q 10/025; H04L 2209/56; H04L 63/0428; H04L 9/083; H04L 9/3263; H04L 63/08; H04L 63/10; H04L 63/102; H04L 9/3236
See application file for complete search history.

(56) References Cited

U.S. PATENT DOCUMENTS

| | | | |
|---|---|---|---|
| 7,653,621 | B2 | 1/2010 | Senthil |
| 7,664,343 | B2 | 2/2010 | Withum et al. |
| 7,904,732 | B2 | 3/2011 | Cui et al. |
| 9,342,849 | B2 | 5/2016 | Hu et al. |
| 9,361,481 | B2 | 6/2016 | LaFever et al. |
| 2002/0073099 | A1 | 6/2002 | Gilbert et al. |
| 2017/0004325 | A1 | 1/2017 | Prem et al. |
| 2017/0201498 | A1 | 7/2017 | Baig et al. |

(Continued)

FOREIGN PATENT DOCUMENTS

WO 2017208236 A1 12/2017

OTHER PUBLICATIONS

Eschner,L., & Hinze, A. (2008). Design and formal model of an event-driven and service-oriented architecture for the Mobile Tourist Information System TIP (Computer Science Working Papers 14/2008). Hamilton, New Zealand: Department of (Year: 2008).*

(Continued)

*Primary Examiner* — George Chen
(74) *Attorney, Agent, or Firm* — Vorys, Sater, Seymour and Pease LLP; Rex W. Miller, II

(57) ABSTRACT

A cryptographically enforced data exchange is disclosed that enables an exchange of customer travel records between a plurality of travel providers while preserving customer privacy. The disclosed system receives customer travel data from publishers, and communicates a portion of the customer travel data to one or more subscribers in response to determining a customer match, without disclosing any protected data elements between the publisher and the subscriber.

30 Claims, 5 Drawing Sheets

(56) References Cited

U.S. PATENT DOCUMENTS

2017/0222814 A1* 8/2017 Oberhauser ............ H04L 9/3247
2018/0157999 A1* 6/2018 Arora ..................... G06Q 10/02

OTHER PUBLICATIONS

Xiaoping Zhou, Xun Lian, Haiyan Zhang, Yuefeng Ma, Cross-Platform Identification of Anonymous Identical Users in Multiple Social Media Networks, IEEE Transactions on Knowledge and Data Engineering 28 (Oct. 1, 2016): 411-424.

Yutao Zhang, Jie Tang, Zhilin Yang, Jian Pei, Philip S. Yu, COSNET: Connecting Heterogeneous Social Networks With Local and Global Consistency, KDD' 15, Aug. 10-13, 2015, Sydney, NSW, Australia, 2015 ACM ISBN 978-1-4503-3664-2/15/08, DOI: http://dx.doi.org/10.1145/2783258.2783268.

H. Brendan McMahan, Eider Moore, Daniel Ramage, Seth Hampson, Blaise Agüera y Arcas, Communication-Efficient Learning of Deep Networks From Decentralized Data, Feb. 28, 2017, Proceedings of the 20th International Conference on Artificial Intelligence and Statistics (AISTATS) 2017, Fort Lauderdale, Florida, US. JMLR: W&CP vol. 54.

Nitish Korula, Silvio Lattanzi, An Efficient Reconciliation Algorithm for Social Networks, 40th International Conference on Very Large Data Bases, Sep. 1-5, 2014, Hangzhou, China, Proceedings of the VLDB Endowment, vol. 7, No. 5, pp. 377-388.

Mohsen Bayati, Margot Gerritsen, David F. Gleich, Amin Saberi, Ying Wang, Algorithms for Large, Sparse Network Alignment Problems, 2009 Ninth IEEE International Conference on Data Mining, IEEE Computer Society, The University of British Columbia Library, Jan. 31, 2010, pp. 705-710.

David Guy Brizan, Abdullah Uz Tansel, A Survey of Entity Resolution and Record Linkage Methodologies, Communications of the IIMA, 2006 vol. 6, Issue 3, pp. 41-50.

Mikhail Bilenko, Raymond J. Mooney, Adaptive Duplicate Detection Using Learnable String Similarity Measures, Proceedings of the Ninth ACM SIGKDD International Conference on Knowledge Discovery and Data Mining (KDD-2003), Washington DC, Aug. 24-27, 2003, pp. 39-48.

Francesco Buccafurri, Gianluca Lax, Antonino Nocera, Domenico Ursino, Discovering Links Among Social Networks, DIMET, (2012) University "Mediterranea" of Reggio Calabria, Via Graziella, Localit'a Feo di Vito, 89122 Reggio Calabria, Italy.

Luca Bonomi, Li Xiong, Frequent Grams Based Embedding for Privacy Preserving Record Linkage, CIKM' 12, Oct. 29-Nov. 2, 2012, Maui, HI, US, pp. 1597-1601.

Pawel Jurczyk, MS, James J. Lu, PhD, Li Xiong, PhD, Janet D. Craga, MD, MPH, Adolfo Correa, MD, MPH, PhD, FRIL: A Tool for Comparative Record Linkage, (2008) National Center on Birth Defects and Developmental Disabilities, Centers for Disease Control and Prevention, Atalanta, GA, US.

Siyuan Liu, Shuhui Wang, Feida Zhu, Jinbo Zhang, Ramayya Krishnan, HYDRA: Large-Scale Social Identity Linkage Via Heterogeneous Behavior Modeling, (2014) http://www.mysmu.edu/faculty/fdzhu/paper/SIGMOD'14.pdf.

Marti Motoyama, George Varghese, I Seek You: Searching and Matching Individuals in Social Networks, WIDM '09, Nov. 2, 2009, Hong Kong, China, pp. 67-74.

Sergey Bartunov, Anton Korshunov, Seung-Taek Park, Wonho Ryu, Hyungdong Lee, Joint Line-Attribute User Identity Resolution in Online Social Networks, The 6th SNA-KDD Workshop '12 (SNA-KDD '12) Aug. 12, 2012, Beijing, China.

IBM InfoSphere Identity Insight Technical Deep Dive, Information Management, White Paper, Mar. 2010, 32 pages.

Marcin Andrychowicz, Misha Denil, Sergio GómezColmenarejo, Matthew W. Hoffman, David Pfau, Tom Schaul, Brendan Shillingford, Nando de Freitas, Learning to Learn by Gradient Descent, 30 Conference on Neural Information Processing Systems (NIPS 2016) Barcelona, Spain, Nov. 30, 2016.

Shulong Tan, Ziyu Guan, Deng Cai, Xuzhen Qin, Jiajun Bu, Chun ChHen, Mapping Users Across Networks by Manifold Alignment on Hypergraph, Proceedings of the Twenty-Eighth AAAI Conference on Artificial Intelligence, Association for the Advancement of Artificial Intelligence (www.aaai.org), 2014.

Haochen Zhang, Min-Yen Kan, Yiqun Liu, Shaoping Ma, Online Social Network Profile Linkage, In: Jaafar A. et al. (eds) Information Retrieval Technology. AIRS 2014. Lecture Notes in Computer Science, vol. 8870. Springer, Cham, https://link.springer.com/chapter/10.1007/978-3-319-12844-3_17.

Monica Scannapieco, Ilya Figotin, Elisa Bertino, Ahmed Elmagarmid, Privacy Preserving Schema and Data Matching, SIGMOD '07, Jun. 11-14, 2007 Beijing, China.

S. Rane, W. Sun, Privacy Preserving String Comparisons Based on Levenshtein Distance, Mitsubishi Electric Research Laboratories, http://www.merl.com, Mitsubishi Electric Research Laboratories, Inc. 2010, 201 Broadway, Cambridge, MA, US.

Rob Hall, Stephen E. Feinberg, Privacy-Preserving Record Linkage, (2010) http://www.cs.cmu.edu/~rjhall/linkage_survey_final.pdf.

Omar Benjelloun, Hector Garcia-Molina, David Menestrina, Qi Su, Steven Euijong Whang, Jennifer Widom, SWOOSH: A Generic Approach to Entity Resolution, Stanford University Computer Science Department, Stanford, CA 94305, US, The VLDB Journal (2009) 18: 255, https://doi.org/10.1007/s00778-008-0098-x.

Mohamed G. Elfeky, Vassilios S. Verykios, Ahmed K. Elmagarmid, TAILOR: A Record Linkage Toolbox, (2002) https://www.cs.purdue.edu/homes/ake/pub/TAILOR_ICDE2002.pdf.

Kai Shu, Suhang Wang, Jiliang Tang, Reza Zafarani, Huan Liu, User Identity Linkage Across Online Social Networks: A Review, Dec. 2016, http://www.kdd.org/exploration_files/18-2-Article2.pdf.

Xin Mu, Feida Zhu, Ee-Peng Lim, Jing Xiao, Jianzong Wang, Zhi-Hua Zhou, User Identity Linkage by Latent User Space Modelling, (2016). Proceedings of 22nd ACM SIGKDD international conference on knowledge discovery and data mining. Research Collection School of Information Systems, http://ink.library.smu.edu.sg/sis_research/3185.

Tobias Bachteler, Jörg Reiher, TDGEN: A Test Data Generator for Evaluating Record Linkage Methods, German Record Linkage Center, Working Paper Series, No. WP-GRLC-2012-01, Jul. 2, 2012, Nurenberg, DE.

Tobias Bachteler, Jorg Reiher, Rainer Schnell, A Simplified Variant of a Protocol for Privacy-Preserving String Comparison, German Record Linkage Center, Working Paper Series, No. WP-GRLC-2011-01, July 1, 2011, Nurenberg, DE, https://www.uni-due.de/~hq0215/documents/2011/schnell_bachteler_reiher_2011_a_simplified_variant_of_a_protocol_for_privacy-preserving_string_comparison.pdf.

William W. Cohen, Pradeep Ravikumar, Stephen E. Fienberg, A Comparison of String Metrics for Matching Names and Records, 2003, American Association for Artificial Intelligence, http://www.cs.cmu.edu/~wcohen/postscript/kdd-2003-match-ws.pdf.

* cited by examiner

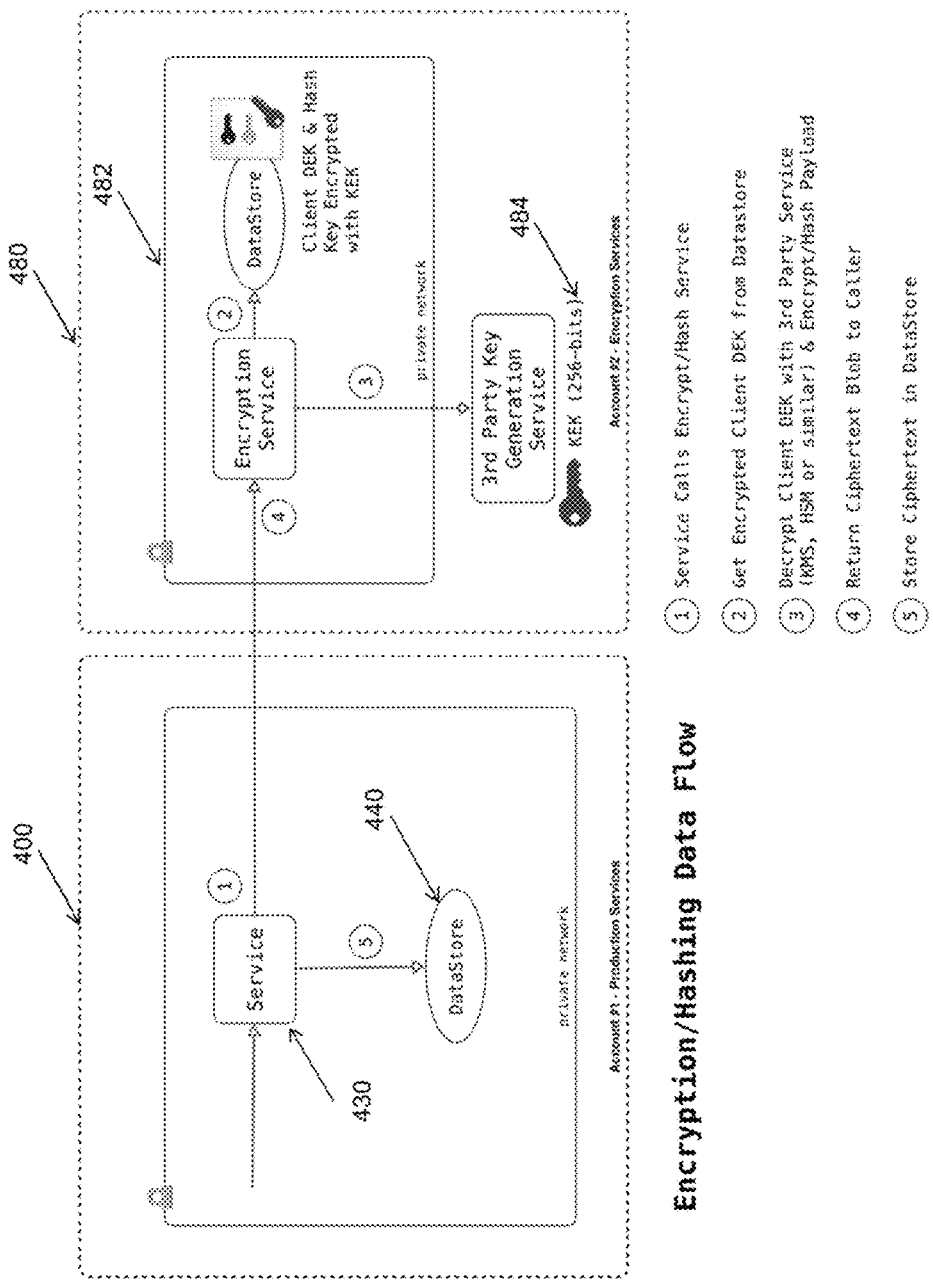

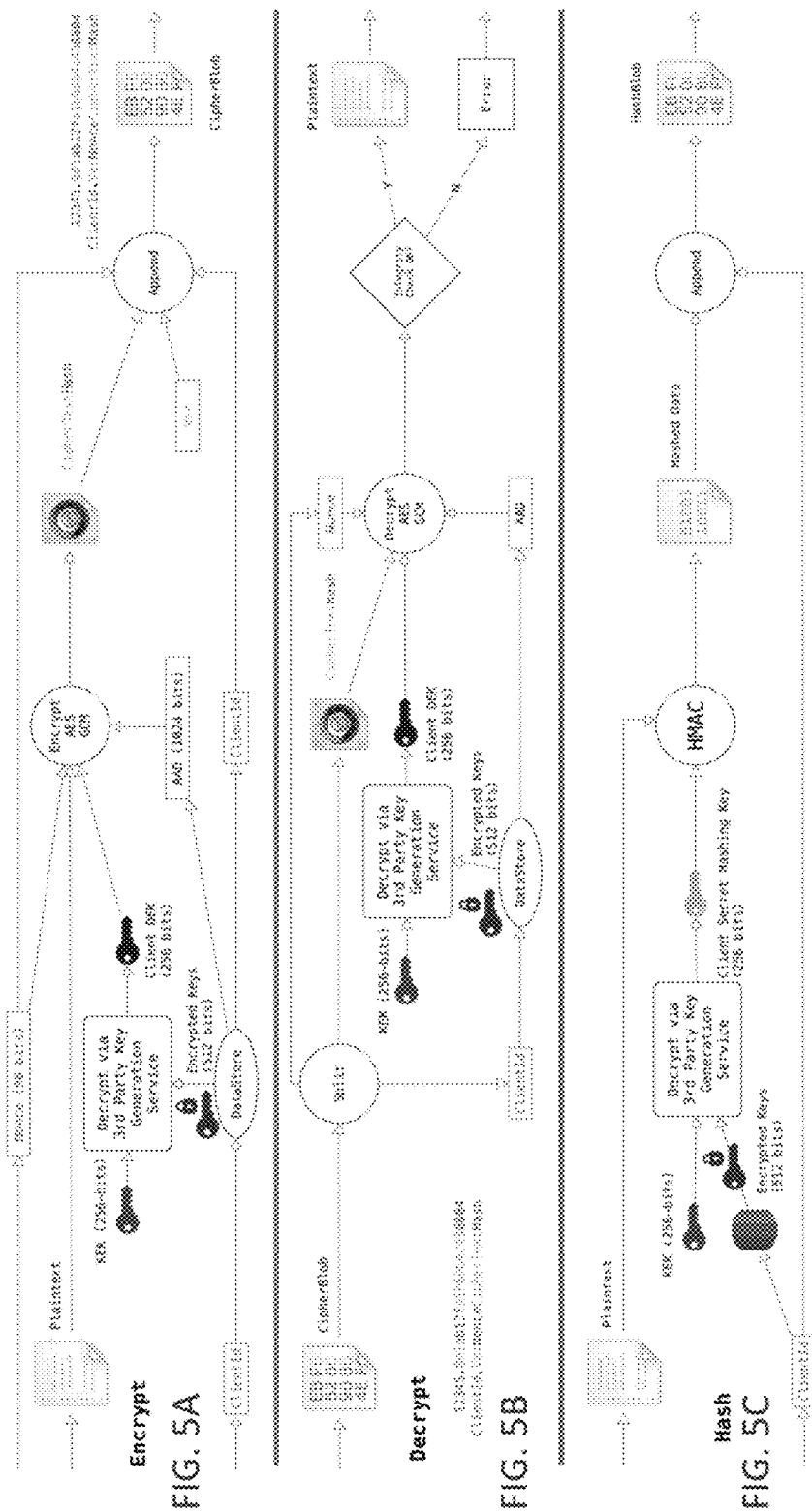

CRYPTOGRAPHICALLY ENFORCED DATA EXCHANGE

CROSS-REFERENCE TO RELATED APPLICATION

This application claims priority from U.S. Patent Application No. 62/647,011 filed on Mar. 23, 2018, which is incorporated by reference herein in its entirety.

BACKGROUND OF THE INVENTION

The present disclosure relates to a system and method for matching and exchanging customer records between a plurality of providers while preserving customer privacy, and more specifically to systems and methods for a cryptographically enforced data exchange for customer travel data.

Many industries would benefit from the ability to exchange customer records among multiple service providers, each of whom have a separate relationship with the customer, while preserving customer privacy and the confidentiality of each provider's unique customer information. For example, in the travel industry, a customer often interacts with multiple travel providers who each provide a portion of the services required by the customer. A customer may have separate reservations with an airline, a hotel and a car rental company, all associated with the same trip. Each travel provider has its own relationship with the customer, but often lacks knowledge of the customer's relationship with other travel providers and the services they will provide in connection with the same trip. The customer and the travel providers would benefit if the travel providers were aware of the customer's related reservations. However, existing systems have not provided efficient and secure methods for matching reservations relating to a specific trip by a customer and exchanging such information in a manner that adequately protects customer privacy and allows a service provider to control the distribution and use of its proprietary information. Accordingly, there remains a need for systems and methods for matching records and exchanging customer records while preserving customer privacy and controlling the distribution of proprietary information.

SUMMARY OF THE INVENTION

Presently disclosed is a cryptographically enforced data exchange for enabling an exchange of customer travel records between a plurality of travel providers while preserving customer privacy. In various embodiments, the system includes a communication component, a normalization component, a cryptographic component, a storage component, and a matching component.

The communication component receives customer travel data from each of a plurality of publishers, wherein each publisher is a travel provider. The communication component may also communicate a portion of the customer travel data to one or more of a plurality of subscribers, wherein each subscriber has requested to receive travel records from other publishers for customers known to said subscriber. Customer travel data may include one or more protected data elements identifying a customer and one or more travel records associated with a travel itinerary for such customer, and protected data elements may include customer protected data elements and travel provider protected data elements. The normalization component tokenizes the protected data elements into a plurality of tokens. The cryptographic component hashes each customer protected data element using a system hash key, and hashes each travel provider protected data element using a provider hash key selected based on which travel provider created the travel provider protected data element. A provider hash key is provided for each travel provider. The storage component receives and stores the tokenized, hashed protected data elements and the travel records. The matching component, in response to receiving customer travel data, determines a customer match by comparing the tokenized, hashed protected data elements to previously received tokenized, hashed protected data elements to match a customer with a previously identified customer. The communication component, in response to determining a customer match, communicates at least a portion of the travel record received from a publisher for the customer to the subscriber without disclosing any of the protected data elements between the publisher and the subscriber.

BRIEF DESCRIPTION OF THE FIGURES

The invention can be best understood from the following detailed description of exemplary embodiments of the invention taken in conjunction with the accompanying drawings.

FIG. 4 is a diagram illustrating operation of a cryptographic component according to an embodiment of the present disclosure.

FIG. 5 is another diagram illustrating operation of a cryptographic component according to an embodiment of the present disclosure.

DETAILED DESCRIPTION

Figure 1:
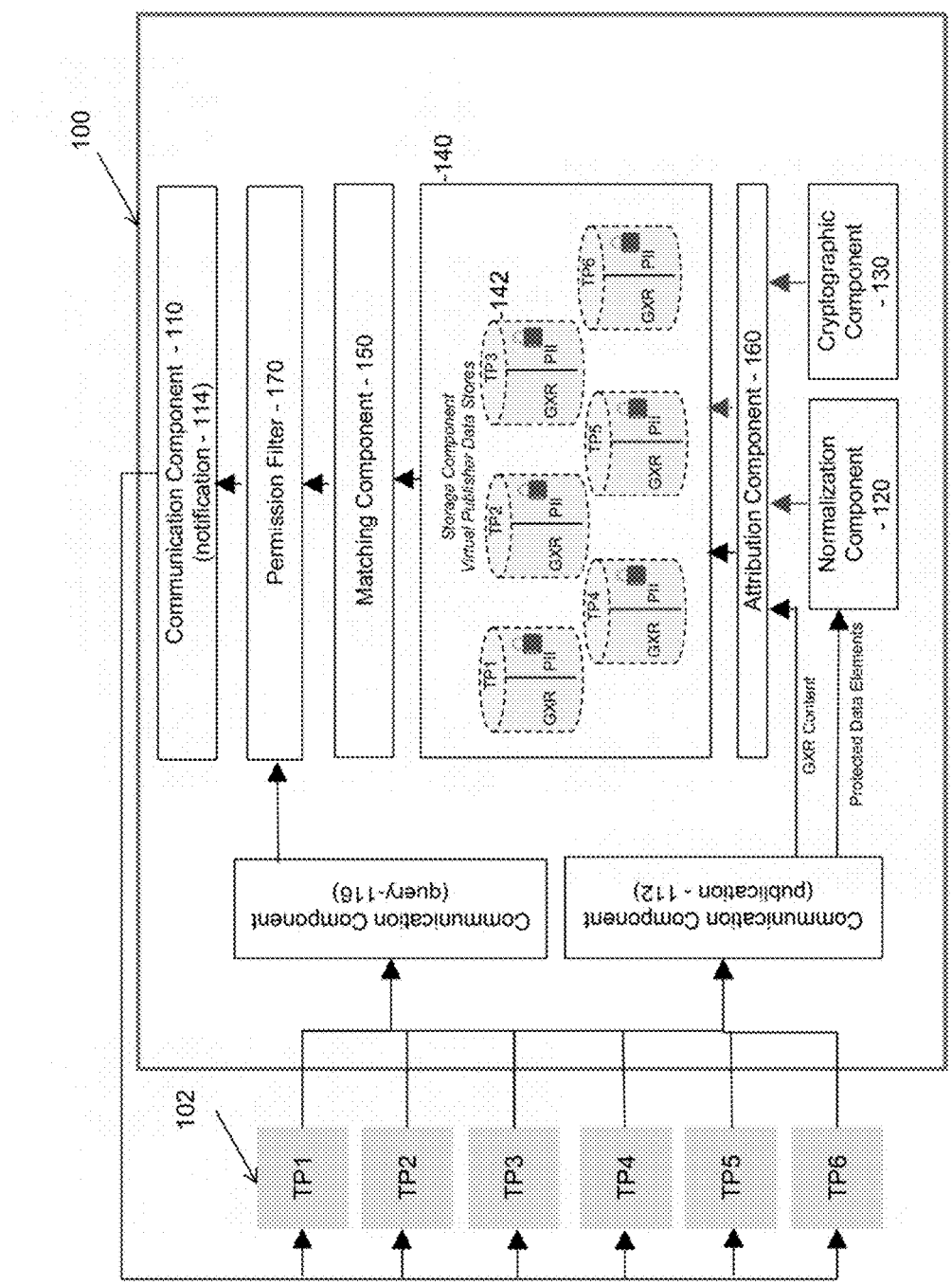
FIG. 1 is an embodiment of a system according to the present disclosure.

Embodiments of the subject matter presently disclosed relate to systems and methods for matching and exchanging customer records between multiple providers while preserving customer privacy. The disclosed subject matter further relates to a cryptographically enforced record matching and data exchange for exchanging customer travel records among travel providers in the travel industry. For purposes of illustration, the presently disclosed subject matter is described in connection with the matching and exchange of customer travel records among a plurality of travel providers, however the disclosed subject matter may also be used for the matching and exchange of other records among entities outside of the travel industry.

Referring generally to FIGS. 1-5, embodiments of a cryptographically enforced record matching and data exchange are disclosed that enable the identification of related records and exchange of such customer travel records between a plurality of travel providers while preserving customer privacy. A travel provider refers generally to a company or other entity providing travel related services to one or more customers, and a customer is an individual receiving travel related services from one or more travel providers. For purposes of illustration, travel providers may include airlines, hotels, and car rental companies, as well as companies, groups or organizations representing multiple entities. A customer may make reservations with one or more travel providers, such that each travel provider has and maintains customer travel data and records for multiple customers. As used herein, customer travel data includes both protected data elements and travel records. The protected data elements include information that identifies the customer and includes both customer protected data elements and travel provider protected data elements. The protected data elements include customer data elements which are supplied by, or for, the customer (such as name, address, email, etc.). The protected data elements also include travel provider protected data elements which are assigned by a particular travel provider (e.g. loyalty program number, etc.). The protected data elements are used to facilitate matching the records of specific customers and specific trips between travel providers, but are not exchanged between travel providers, such that a travel provider may not learn sensitive details about a customer from another travel provider having that information. The travel records of the customer travel data will, for example, often include a travel itinerary for a given customer. More generally, a travel record may include reservations, event details or other information associated with the given customer's activities. In some instances, certain information, such as a loyalty program number, may be both a protected data element and may be included in a travel record if such information is intended to be shared among travel providers. In contrast to protected data elements used for record matching, the travel records may be exchanged between travel providers in accordance with the presently disclosed systems and methods while preserving customer privacy. The term customer privacy is used to generally refer to both official privacy requirements of applicable laws, rules and regulations, as well as privacy obligations or commitments that may be adopted by companies or industries.

Referring now to FIG. 1, an embodiment of a cryptographically enforced record matching and data exchange system 100 is illustrated. The system 100 communicates with a plurality of travel providers 102. The system 100 receives customer travel data from at least a portion of the travel providers 102 that publish customer travel data to the system. Each travel provider 102 that publishes travel data to the system may be referred to as a "publisher." The system 100 uses data masked by cryptographic measures to match travel records between travel providers. In addition, the system 100 may communicate at least a portion of a travel record received from one travel provider to another travel provider that has provided records matched to the customer and has requested to receive certain types of travel records from other publishers. A travel provider 102 that has requested to receive travel records for certain matched customers may be referred to as a "subscriber." In many embodiments, a travel provider is both a publisher and subscriber, and may function as both publisher and subscriber simultaneously.

The system 100 includes a communication component 110, a normalization component 120, a cryptographic component 130, a storage component 140, and a matching component 150. In some embodiments, the system also includes an attribution component 160. In yet other embodiments, the system includes a permissions filter 170.

The communication component 110 is configured to communicate with the publishers and subscribers. The communication component 110 may include a publication component 112 configured to receive customer travel data from each of the plurality of publishers. The communication component 110 may also include a notification component 114 configured to communicate at least a portion of the travel records to a subscriber as further described below. In this manner, the communication component 110 enables the system 110 to communicate in real-time with the plurality of travel providers 102 to both receive and send customer travel data as determined by the system. In some embodiments, the communication component 110 is also configured to communicate with customers as well as travel providers as described further below. As used herein, the term "real-time" is not limited to instantaneous operation, and allows for the typical delays associated with efficient operations of computing system, as well as high frequency periodic operations.

The customer travel data received from each publisher contains protected data elements and travel records. The communication component 110 is further configured to receive the elements of the customer travel data simultaneously or in batches based upon how the data is published by the travel provider. For example, a travel provider may publish a customer reservation including both the protected data elements and the travel records in a single communication to the system. Alternatively, a travel provider may publish a customer list containing protected data elements for multiple customers, and separately publish a reservation list containing multiple reservations each associated with a customer in the customer list. The customer list and reservation list may be published by the travel providers and received by the system in any order so long as the travel provider provides an association between each reservation and a customer.

Upon receiving customer travel data, the normalization component 120 is configured to tokenize the protected data elements into a plurality of tokens. As noted above, the protected data elements include customer identifying elements such as a customer's name and address. In some embodiments, the protected data elements are further segmented into discrete elements referred to as tokens. For example, a customer's name may be tokenized into a first name token and last name token. A customer's address may be tokenized into tokens for a street number, street name, city, state, and zip code. Other tokens may be used and some tokens may contain overlapping information (e.g. 5 digit zip code, 9 digit zip code).

The tokenization of the protected data elements by the normalization component 120 facilitates the privacy preserving matching of customers by the matching component 150 as described further below. In some embodiments, the normalization component 120 is further configured to standardize the protected data elements in order to increase consistency prior to tokenization. For example, the normalization component may use an address standardization service to standardize postal addresses before tokenizing the address. In another example, the normalization component may standardize capitalization or remove (or segment) prefixes or suffixes from customer names. In yet other embodiments, the normalization component generates permutations of the protected data elements, and the permutations are used in subsequent matching. For example, permutations may include expansion or contraction of common terms (e.g. Dr. vs. Drive; Ave. vs. Avenue) or expansion or contraction of names (e.g. John vs. Johnathan). In this manner, matching may be performed on the permutations to improve the likelihood of correctly matching customers between multiple providers.

After the protected data elements are tokenized by the normalization component 120, at least the protected data elements are hashed by the cryptographic component 130 to protect customer privacy. In some embodiments, the cryptographic component 130 is configured to hash each customer protected data element using a system hash key, and hash each travel provider protected data element using a travel provider hash key selected based on which travel provider created the travel provider protected data element. The system hash key and each travel provider's hash key are maintained by the system and not shared with any of the travel providers. In this manner, the cryptographic component 130 obscures both the customer protected data elements and the travel provider protected data elements preventing the exchange of protected data elements between travel providers and enhancing the protection of such data while stored, while enabling the matching of customers based on the hashed protected data elements as described below.

The customer protected data elements associated with a specific customer are received from multiple travel providers. In order to enable the comparison of customer protected data elements after hashing, the system 100 uses a system hash key for hashing customer protected data elements regardless of which travel provider provided the information.

In contrast, travel provider protected data elements are created or assigned by one travel provider, but may be known by other travel providers. For example, when making a hotel reservation, a customer may provide its airline frequent flyer number to the hotel. In this example, the airline is the creator of the frequently flyer number. When the hotel publishes the customer's reservation to the system 100, the hotel may include the airline frequent flyer number as a customer identifier as part of the protected data elements. Similarly, the customer may have provided its airline frequent flyer number to a car rental company, which then publishes the customer rental reservation including the airline frequent flyer number as part of the protected data elements. In order to compare and match the frequently flyer number received from the hotel and the car rental company, the system assigns a provider hash key to the airline. Upon receiving the airline frequent flyer number from the hotel and the car rental company, the cryptographic component 130 selects the airline's provider hash key to hash the frequent flyer number. In the same manner, the cryptographic component would select a provider hash key assigned to the hotel if the airline published the hotel's loyalty program number for a customer to the system. By hashing the travel provider protected data element with a provider hash key selected based on which travel provider created the travel provider protected data element, the system 100 is able to compare and match customer identifying information received from different travel providers after the identifying information has been hashed by the cryptographic component.

In yet other embodiments, the cryptographic component 130 is configured to encrypt the customer protected data elements and the travel provider protected data elements using one or more encryption keys such that the customer protected data elements and the travel provider protected data elements may be decrypted and recovered by the system 100.

In yet another embodiment, the system 100 assigns to each travel provider, whether functioning as a publisher or subscriber, a provider hash key and a provider data decryption key. In the event the provider publishes a travel record that contains sensitive information, such as a loyalty program number embedded in the travel record, at least the sensitive portion of the travel record may be encrypted with the provider data encryption key. If the travel record is to be provided to a subscriber, the travel record is decrypted with the provider's (i.e. publisher's) data decryption key prior to being communicated to the subscriber by the communication component.

Once the protected data elements of the received customer travel data have been hashed or encrypted by the cryptographic component 130, the customer travel data is communicated to the storage component 140. The storage component 140 includes one or more databases for the durable storage of the customer travel records. In embodiments, the storage component 140 may include a plurality of virtual publisher data stores 142 each representing the customer travel data received from one publisher. Each virtual publisher data store includes the travel records and the hashed protected data elements.

In various embodiments, the normalization component 120 and the cryptography component 130 operate to tokenize and hash the protected data elements in real-time upon receipt of the protected data elements by the communication component. In some embodiments, the protected data elements are maintained only in temporary storage during the normalization and cryptography processes and only communicated to the storage component 140 for durable storage once the protected data elements are hashed. Because the protected data elements are hashed prior to storage, the protected data elements are secured both from inadvertent communication with another travel provider and are protected in storage from unauthorized access.

In response to receiving customer travel data from a publisher, the system 100 operates to determine customer matches and, optionally, trip matches to identify travel records associated with the same trip. In an embodiment, the matching component 150 is configured to determine a customer match by comparing the tokenized, hashed protected data elements to previously received tokenized, hashed protected data elements. By way of illustration, the matching component 150 compares the protected data elements received from a first publisher with the protected data elements received from a second publisher. Upon determining that two publishers have a common customer (i.e. a customer match), the matching component 150 compares the travel record data for the identified customer to determine a trip match. A trip match refers to a determination that two or more travel records relate to the same trip or journey for the common customer and should be associated across the different travel providers. In an embodiment, the matching component 150 determines a trip match based on a comparison of at least one of a time, a date, and a location associated with at least a pair of travel records for the common customer. For example, a flight reservation into a city and a hotel reservation within a selected distance from that city on the same date for the same customer may be determined to be a matching trip.

In some embodiments, when determining a customer match, the matching component 150 performs an exact match on each element of the tokenized, hashed protected data elements. Even though two publishers may have a common customer, however, the protected data elements known to each publisher about the common customer may be different. For example, such differences may arise for a variety of reasons such as shortened names (e.g. John versus Johnathan), and variations in address formats (123-A Street versus 123 Street, Apt. A). Similarly, a customer may have multiple phone numbers (e.g. work, home, mobile), and different providers may have received different combinations of such numbers from the customer. Some prior art systems accommodate this type of variation by performing an approximate string match, commonly referred to as a fuzzy match. Because the system 100 performs matching on tokenized, hashed protected data elements this type of fuzzy match is not possible. The matching component 150 therefore performs an exact match on each element of the protected data elements for the elements which are available from each publisher. For example, if one publisher provided a street address of 123 Street Dr. and a second publisher provided an address of 123 Street Dr., Apt. A, the matching component may identify an exact match of the tokenized street number ("123") and street name ("Street Dr."). Because only one publisher provided the apartment designation, that element would not be matched between the two records. Similarly, if both publishers have provided a mobile phone number for the customer, a match can be performed. If only one publisher has provided a work phone number however a match cannot be performed. More generally, the matching component 150 is configured to match customers across disparate data sets in which the number of data elements in each data set may be different.

In addition to determining exact matches of the protected data elements, the matching component 150 determines a confidence level of a customer match based on the number of matching protected data elements. The confidence level is a calculated value corresponding to the confidence that a customer is known to each of two or more publishers based on the element-by-element comparison of hashed values. In some embodiments, the matching component 150 determines the confidence level based, at least in part, on the number of matching or mis-matching protected data elements, such as: (1) the number of protected data elements known to each publisher that match, (2) the number of protected data elements known to each publisher that do not match, (3) the number of protected data elements known to one of the publishers, but not to the other publisher. In some embodiments, the confidence level is based, at least in part, on an element discount factors or match/unmatch weights associated with the relative importance of each element of the protected data elements. By way of illustration, each protected data element may be assigned a match weight and an unmatch weight, where a match weight increases based on the likelihood that the matching element positively correlates with a customer match, and the unmatch weight increases based on the likelihood that the unmatched element negatively correlates with a customer match. Some elements may have the same match weight and unmatch weight, such as a social security number where a match or mismatch is likely determinative of whether the records refer to the same customer. Other elements may, however, reliably indicate the same customer when matched, but less reliably indicate different customers when mismatched, or vice versa. For example, a mismatch in a customer's last name may strongly indicate the records refer to different customers. A mismatch in a customer's first name, however, may be a less reliable indication given the use of shorted names. By determining the confidence level based on these relative measures of reliability, the system 100 may identify a customer match when the determined confidence level meets or exceeds a selected threshold. In some embodiment, a subscriber may select the threshold for determining customer matches based on the degree of certainty required for the subscriber's business processes. Similarly, a publisher may select a threshold for determining customer matches based on the degree of certain the publisher requires before exchanging travel records. The system 100 may also impose a minimum system threshold.

When the system 100 determines at least a customer match, the system 100 permits communication of at least a portion of the travel record received from the publisher for the customer to the subscriber, based on the request of the subscriber and the permissions established by the publisher. The system 100 may further determine trip matches to identify travel records associated with the same trip. In an embodiment, the notification component 114 of the communication component 110 transmits the travel record from the publisher to the subscriber to augment the subscriber's travel record for that customer. In this manner, the subscriber may provide improved service. For example, a hotel, as subscriber, may receive a customer's travel record published by the airline. By knowing when the customer is scheduled to arrive at the airport, the hotel may ensure that the hotel shuttle is available to transport the customer from the airport to the hotel, offer early check in, late dining or other services, and by monitoring flight information, may account for delays in the customer's travel plans.

For the notification component 114 to communicate the publisher's travel record to the subscriber, the matching component 150 must have determined at least a customer match. As previously discussed, the customer match is determined based on a comparison of the publisher-provided protected data elements and the subscriber-provided protected data elements. Only if the subscriber and publisher are determined to have a common customer, is travel record information disclosed to the subscriber. The protected data elements, however, are not provided to the subscriber. If the subscriber does not already have enough protected data elements in order to generate a customer match, the subscriber will not be able to access the travel records for that customer. The protected data elements therefore operate as an additional key allowing the subscriber to access the travel records, but only if the subscriber knows the customer. The system 100 thus enables the exchange of travel records between the travel providers while preserving customer privacy.

In some embodiments, the system 100 includes a permissions filter 170 to further refine the content of the travel record exchanged from publishers to subscribers. Based on various business considerations, publishers using the system 100 may desire to limit which travel records are disclosed to which potential subscribers. The system 100 may be configured to receive permissions from the publishers regarding elements of the customer travel records that are permitted to be shared with the subscribers. The publisher provided permissions may be applicable to all subscribers, or may allow different subscribers to receive different portions of the travel record content. Similarly, subscribers may desire to limit requests to targeted customers, or limit the portion of travel records that subscribers receive to only the useful portion of the travel record for the subscriber's business. The system 100 may thus apply the permissions filter 170 to the travel records to be communicated out to subscribers before transmitting those travel records with the notification component 114.

In some embodiments, the system 100 includes an attribution component 160. The attribution component 160 receives at least the tokenized, hashed protected data elements prior to storage in the storage component 140. In embodiments, the attribution component 160 also receives the travel records published by the publishers. The attribution component 160 is configured to attribute each tokenized and hashed element of the protected data elements with the publisher or subscriber that provided the particular protected data elements. If the same protected data element (e.g. last name) is received from two or more providers who each know the customer, the attribution component 160 attributes that protected data element to each of the two or more providers that provided the elements. In a particular embodiment, the attribution component 160 attributes a protected data element to one or more publishers or subscribers by appending an identification for each publisher or subscriber to the protected data element. The attribution component 160 may also attribute the received travel record to the publisher or subscriber providing such records in the same manner prior to storage in the storage component.

By attributing each protected data element to the publisher or subscriber that provided such element, the system 100 is capable of determining which elements are known by which publishers or subscribers, even though the protected data elements are tokenized and hashed prior to storage. This capability enables the system to verifiably remove data from the system in the event that a publisher or subscriber desires to withdraw from participation in the data exchange.

In some embodiments, the system 100 is configured to receive a request from a publisher or subscriber to delete all customer travel data provided by that publisher or subscriber and stored in the system. In response to such a request, the system 100 disassociates the specific source from each element of customer travel data stored in the storage component. In addition, the system 100 deletes any element of customer travel data that is no longer associated with any publisher or subscriber thereby removing that customer travel data from the system. If, however the customer travel data is still known by one or more participating publishers or subscribers, the system retains that customer travel data for future use. Also in response to the publisher's or subscriber's request, the system 100 invalidates the provider hash key and the provider data encryption key associated with the publisher or subscriber. When the provider hash key and provider data encryption key are invalidated, the system is no longer capable of creating new hashed protected data elements to match any previously created hashed travel provider protected data elements. Similarly, when the provider data encryption key is invalidated the system is no longer capable of decrypting any of the encrypted data. The ability to enforce the invalidation and removal of travel provider data creates a verifiable record that such data is no longer accessible in or through the system following a request from the publisher or subscriber to remove its data.

In yet other embodiments, the system 100 is configured to receive a request from a customer to delete that customer's information from the system. With the request, the customer may provide the system with the customer's identifying information and optionally any travel provider protected data elements (e.g. loyalty program numbers) assigned to the customer by various travel providers. The system 100 processes the protected data elements provided by the customer in the same manner as previously described, and identifies any matching customer records already known to the system. In response to identifying such matching customer records, the system deletes such records in response to the customer's request to be removed. In order to determine a match, the customer must provide sufficient matching protected data elements in order to generate a match to the protected data elements previously provided by publishers or subscribers knowing that customer. If a customer has multiple names, addresses, phone numbers or other protected data elements, the customer may submit one or more requests to remove each such protected data element. The system 100 may similarly receive a request from a publisher or subscriber to delete information about a specific customer, which would be processed similarly to the customer initiated request.

Figure 2:
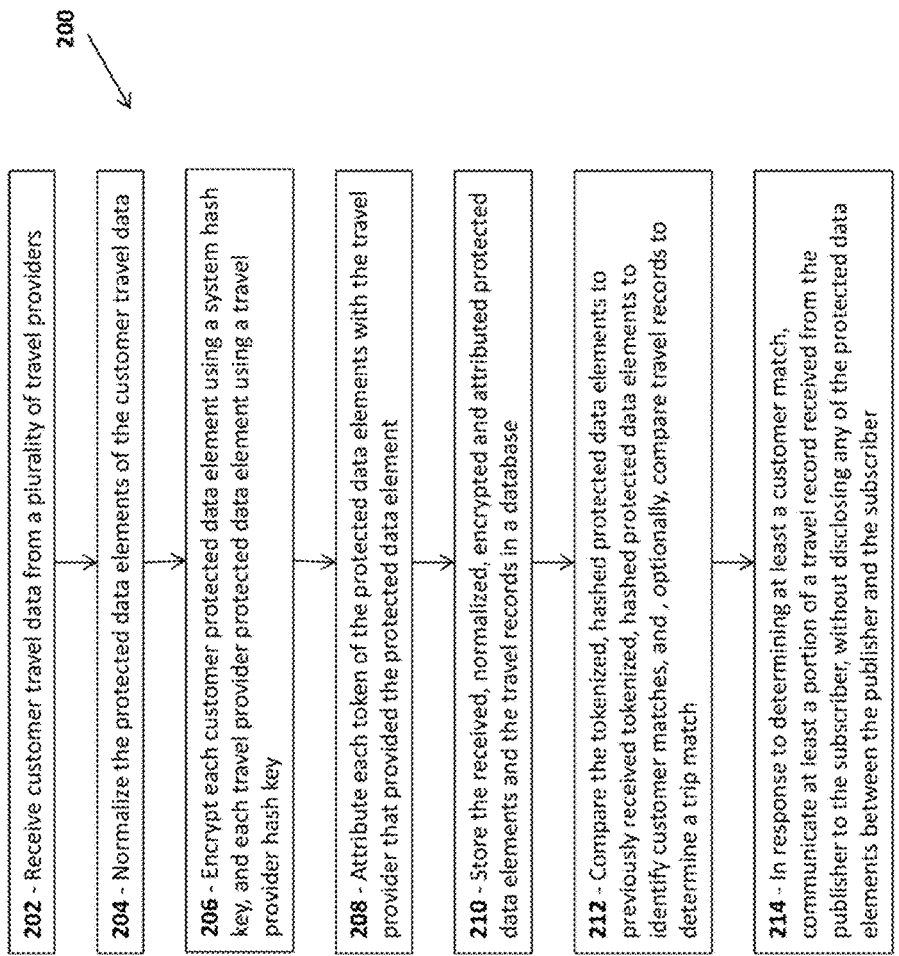
FIG. 2 is a flow chart of a method for record matching and exchanging customer travel data according to the present disclosure.

Referring now to FIG. 2, a method 200 for a privacy preserving data exchange is illustrated. The method 200 includes the step 202 of receiving customer travel data from a plurality of travel providers. The method 200 further includes the step 204 of normalizing the protected data elements of the received customer travel data. The method 200 further includes the step 206 of encrypting each customer protected data element using a system hash key, and each travel provider protected data element using a provider hash key. The method 200 may optionally include in step 206 encrypting a portion of the travel record data with a provider data encryption key. The method 200 further includes the step 208 of attributing each token of the protected data elements with the travel provider that provided the protected data element. The method 200 further includes the step 210 of storing the received, normalized, encrypted and attributed protected data elements and the received travel records in a database, which may include one or more virtual publisher data stores. The method 200 further includes the step 212 of comparing the tokenized, encrypted protected data elements to identify customer matches, and, optionally, comparing travel records to determine trip matches. The method 200 further includes the step 214 of, in response to determining at least a customer match, communicating at least a portion of the travel record received from the publisher to the subscriber, without disclosing any of the protected data elements between the publisher and the subscriber. In various embodiments, the steps of receiving, normalizing, encrypting and attributing are performed in real-time prior to communicating the customer travel data to the database for storage.

Figure 3:
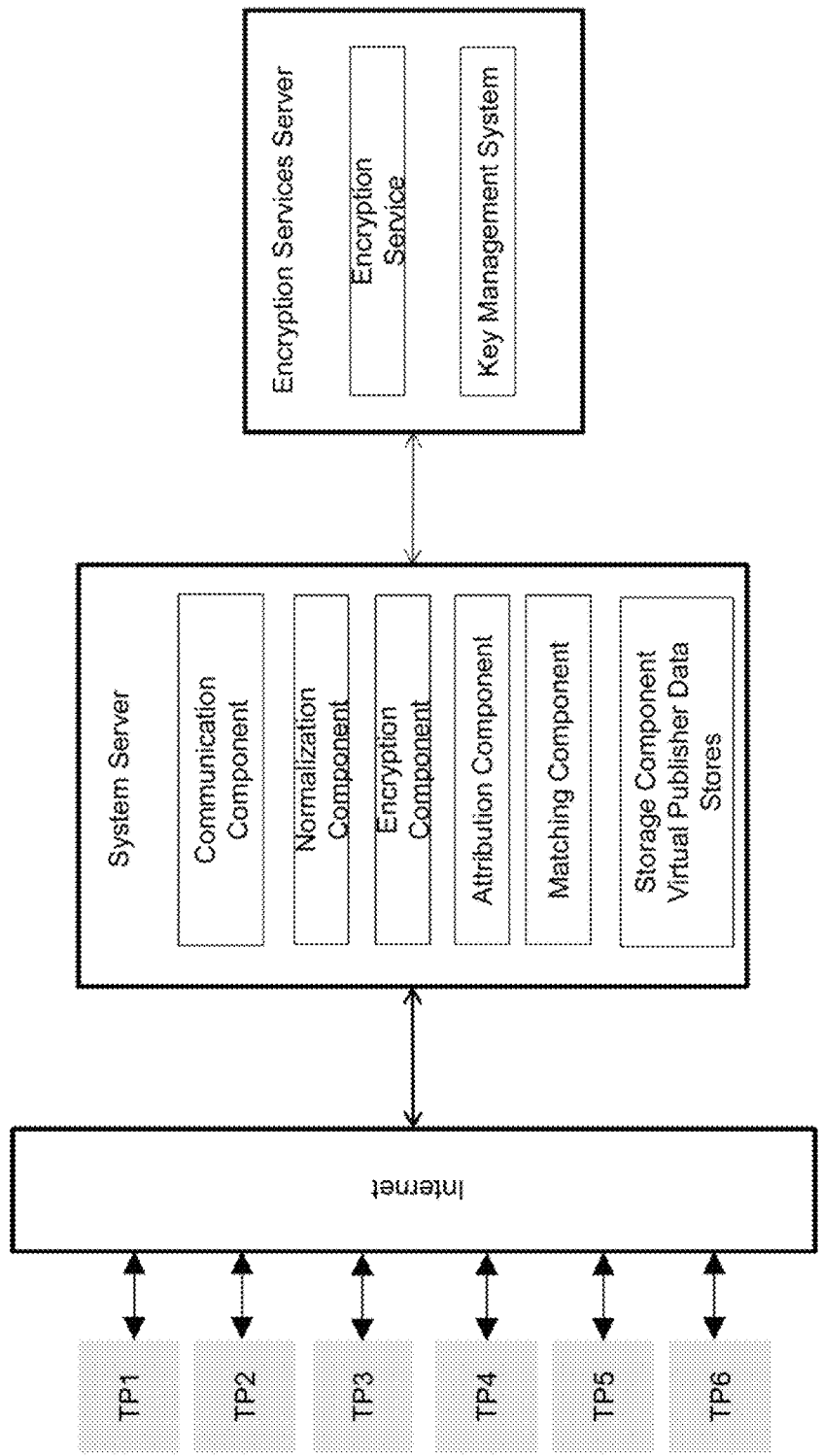
FIG. 3 is a simplified network diagram according to an embodiment of the present disclosure.

Referring now to FIG. 3, an example network layout is illustrated in which the disclosed system and method may operate. In an embodiment, a system server 300 is provided for operation of the system. The system server 300 may be a computing device (or collection of computing devices) that include one or more processors and memory for storing instructions to be executed by the one or more processors. The processor may be communicatively coupled to the memory and configured to execute, or facilitate the execution of the instructions. The instructions may include various components of the system as described herein.

In one embodiment, the system server 300 includes a communication component 310, a normalization component 320, an cryptographic component 330, a matching component 350 and a storage component 340, as previously discussed. The system server 300 may also include an attribution component 360 in some embodiments. The system server 300 may be a physical or virtual server. The system server 300 communicates with multiple travel provider clients 302. The system server 300 and the travel provider clients 302 may communicate over the internet 304 or other communication changes as desired. Communication between the system server 300 and the travel provider clients 302 may be managed by the communication component 310 as previously discussed in order to limit access to the system server and further protect the customer travel data.

In some embodiments, an encryption service server 380 is provided. The encryption services server 380 may include an encryption service 382 and a key management system 384. In some embodiments, the encryption services server 380 is maintained on a separate server, or separate virtual server, in order to further segregate the encryption and hashing functions from the operation of the system protect the hash keys and encryption keys from unauthorized access.

In various embodiments, the cryptographic component 330 of the system communicates with the encryption service 382 over a secure communication channel to perform the hashing, encrypting, and decrypting services described herein. The system hash key, provider hash keys, and provider data encryption keys are managed by the key management system 384 as explained with reference to FIG. 4.

FIG. 4. illustrates the hashing and encrypting data flow of the disclosed system. In embodiments, the cryptographic component 430 resides on system server 400 and communicates with the encryption services server 480, which contains the encryption service 482 and the key management system 484. Upon receiving tokenized protected data elements, at step (1), the cryptographic component 430 invokes the encryption service 482 by providing the protected data element to be hashed or encrypted. At step (2), the encryption service 482 retrieves the system hash key from the key management system 484, and retrieves the appropriate provider hash key and provider data encryption keys from the key management system as necessary. In some embodiments, at least the provider hash key and the provider data encryption key may be further secured by encrypting the keys with a system key encrypting key. In this case, at step (3), the encryption service decrypts the provider hash key(s) and the provider data encryption key using the key management system 484, and then hashes or encrypts the protected data element using the now decrypted keys. At step (4), the hashed or encrypted protected data element is returned from the encryption services server 480 to the cryptographic component 430 of the system server 400. Finally, at step (5), the hashed or encrypted protected data elements are communicated to the storage component 440 and or made available for further processing by the system.

Referring now to FIG. 5, the hashing, encrypting and decrypting data flow of the disclosed system are further illustrated, in combination with the attribution of the protected data elements to the travel provider that provided the protected data element. FIG. 5A illustrates the encryption of a travel record data using a provider data encryption key. The travel record data (plaintext) and the provider identification (ClientID) are received by the cryptographic component. The provider data encryption key is accessed as described above, and used to encrypt the travel record data. The attribution component then appends the publisher identification (ClientID) to the now encrypted travel record data. Additional information may be appended to the travel record data as required for the efficient operation of the system.

FIG. 5B illustrates the decryption of previously encrypted travel record data using a provider data decryption key. As shown, the attributed encrypted travel record data (CipherBlob) is parsed to determine the provider (ClientID) that provided the travel record data. Based on the identified provider, the appropriate provider data decryption key is accessed as described above, and used to decrypt the travel record data. The decrypted travel record data may then be communicated to a subscriber in response to a determined customer match, and optionally a trip match, as previously described.

FIG. 5C illustrates the hashing of a customer protected data element or a travel provider protected data element. As shown, the protected data element (plaintext) is received along with a provider identification (ClientID) that indicates the provider from whom the protected data element was received. Based on whether the protected data element is a customer protected data element or a travel provider protected data element, the system hash key or appropriate provider hash key is accessed as described above, and used to hash the protected data element. As in FIG. 5A, the attribution component then appends the provider identification (ClientID) to the now hashed protected data element.

Referring again to FIG. 1, in yet another embodiment, the communication component 110 of the system 100 may include a query component 116. The query component 116 may be configured to receive a request from a travel provider to search for travel records matching a particular customer or perform other specialized queries using the system 100. The request from the travel provider may identify a particular customer, or group of customers known to the travel provider, as well as other parameters (time, date, geographic location) with which to identify customer matches and/or trip matches. In response to receiving an authorized request through the query component 116, the system processes the received request as previously described to identify corresponding customer matches and trip matches, and then returns, in accordance with any applicable permissions, the travel records corresponding to such matches.

In yet another embodiment, a travel provider may request to subscribe to specific travel records matching customers already published by the travel provider to the system. In still another embodiment, in response to receiving published customer travel data from a travel provider, the system may infer a request to subscribe to any travel records matching that travel provider's customers. In this manner, the system provides significant flexibility for travel providers to participate as a publisher, a subscriber, or both depending upon the travel provider's particular requirements.

The presently disclosed cryptographically enforced data exchange provides the technical effect of enabling the matching and exchange of customer travel records among disparate travel service providers, using only data that has been pseudonymized for customer privacy protection. The subscriber travel record is augmented with information from the publisher travel record to form an integrated travel record allowing for improved customer service, without either the publisher or subscriber acquiring any of the protected data elements known to the other party. Moreover, a subscriber is only able to receive travel records for a given customer, if that subscriber already has sufficient knowledge of the customer in order to generate a customer match. In this manner, the system provides a further technical effect of providing keyed access to customer travel records, in which the key is knowledge of the customer associated with such records.

The presently disclosed system further provides the technical effect of field level data ownership and attribution through the encryption, or hashing of data based on the creator or provider of that data as applicable. This feature further enables the system to provide a provable removal/destruction of data in response to a request by a publisher or customer to review that entity's data from the system.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

In the specification and claims, reference will be made to a number of terms that have the following meanings. The singular forms "a," "an" and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. Similarly, "free" may be used in combination with a term, and may include an insubstantial number, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The term "instructions" as used herein may refer to computer executable instructions.

While principles and modes of operation have been explained and illustrated with regard to particular embodiments, it must be understood, however, that this may be practiced otherwise than as specifically explained and illustrated without departing from its spirit or scope.

What is claimed is:

1. A cryptographically enforced data exchange for enabling an exchange of customer travel records between a plurality of travel providers while preserving customer privacy, the system comprising:
   a communication component configured to receive customer travel data from each of a plurality of publishers, wherein each publisher is a travel provider;
   the communication component further configured to communicate a portion of the customer travel data to one or more of a plurality of subscribers, wherein each subscriber has requested to receive travel records from other publishers for customers known to said subscriber;
   wherein the customer travel data includes one or more protected data elements identifying a customer and one or more travel records associated with a travel itinerary for such customer;
   wherein the protected data elements include customer protected data elements and travel provider protected data elements;
   a normalization component configured to, in real-time, tokenize the protected data elements into a plurality of tokens;
   a cryptographic component configured to, in real-time, hash each customer protected data element using a system hash key, and hash each travel provider protected data element using a provider hash key selected based on which travel provider created the travel provider protected data element;
   wherein a provider hash key is provided for each travel provider;
   a storage component being a cryptographically enforced data store configured to receive and store the tokenized, hashed protected data elements and the travel records;
   a matching component configured to, in response to receiving customer travel data, determine a customer match by comparing the tokenized, hashed protected data elements to previously received tokenized, hashed protected data elements to match a customer with a previously identified customer;
   wherein the communication component is further configured to, in response to determining a customer match, communicate at least a portion of the travel record received from a publisher for the customer to the subscriber without disclosing any of the protected data elements between the publisher and the subscriber thereby preserving customer privacy.

2. The system of claim 1, wherein the cryptographic component is further configured to hash the protected data elements by communicating the protected data elements to an encryption service that hashes each protected data element using one of the system hash key or the provider hash keys, and returns the hashed protected data elements.

3. The system of claim 2, wherein the encryption service further comprises a key management system, and is further configured to retrieve an encrypted provider hash key from the key management system, decrypt the encrypted provider hash key using a system key encrypting key maintained by the key management system of the encryption service, hash the travel provider protected data element using the decrypted provider hash key.

4. The system of claim 3, wherein the key management system stores the system hash key and each provider hash key in an encrypted data store.

5. The system of claim 2, wherein the system hash key and the provider hash keys are not communicated to the system by the encryption service.

6. The system of claim 2, wherein the encryption service is hosted on a different server than the cryptographic component of the system.

7. The system of claim 1 further comprising:
   an attribution component configured to attribute each protected data element with each publisher that provided such protected data element.

8. The system of claim 7, wherein the attribution component is further configured to attribute the protected data element to each of the two or more publishers in response to receiving the protected data element from each of the two or more publishers.

9. The system of claim 7, wherein the attribution component is configured to attribute a protected data element to one or more publishers by appending a publisher identification for each of the one or more publishers to the protected data element.

10. The system of claim 7, wherein, in response to receiving a request from a publisher to delete customer travel data provided by said publisher, the attribution component is further configured to disassociate said publisher from each element of the customer travel data stored in the storage component, and delete each element of customer travel data no longer associated with any publisher, and the cryptographic component is configured to invalidate the provider hash key and the provider data encryption key associated with said publisher.

11. The system of claim 1, wherein the matching component is further configured to perform an exact match on each element of the tokenized, hashed protected data elements and determine a confidence level of a customer match based on at least a number of matching elements.

12. The system of claim 11, wherein the matching component is further configured to determine the confidence level based on element discounting and element match/unmatch weights.

13. The system of claim 11, wherein the matching component is further configured to determine a customer match based on the confidence level of a customer match exceeding a selected threshold.

14. The system of claim 1, wherein the storage component comprises durable storage.

15. The system of claim 14, wherein the normalization component is further configured to tokenize the protected data elements before the protected data elements are transmitted to the durable storage.

16. The system of claim 1, wherein the communication component is further configured to receive subscription requests to receive travel data for one or more customers from a plurality of subscribers, wherein each subscriber is a publisher providing customer travel data for at least a portion of the one or more customers.

17. The system of claim 1, wherein each subscriber is a publisher providing customer travel data for at least a portion of the one or more customers; and wherein a subscription request is inferred in response to a publisher providing customer travel data.

18. The system of claim 1, wherein the one or more protected data elements and the one or more travel records for a customer are received at substantially the same time from a publisher.

19. The system of claim 1, wherein the one or more protected data elements and the one or more travel records for a customer are received at different times and subsequently associated.

20. The system of claim 1, wherein the one or more protected data elements comprise personally identifiable information of a customer.

21. The system of claim 1, wherein travel provider protected data elements comprise a customer identification assigned by a travel provider.

22. The system of claim 1, wherein the normalization component is further configured to tokenize the protected data elements upon receipt of the protected data elements by the communication component.

23. The system of claim 1, wherein the normalization component is further configured to standardize the protected data elements prior to tokenizing the protected data elements to facilitate matching of the tokenized protected data elements.

24. The system of claim 1, wherein the travel provider protected data element is received from a publisher other than the travel provider that created the travel provider protected data element.

25. The system of claim 1, wherein the cryptographic component is further configured to encrypt at least a portion of a travel record using a provider data encryption key provided for the publisher that provided the travel record; and to decrypt at least a portion of the travel record using the provider data encryption key prior to said travel record being communicated to a subscriber.

26. The system of claim 1, wherein the storage component comprises a database.

27. The system of claim 1, wherein the matching component is configured to determine a trip match based on a comparison of at least one of a time, a date, and a location associated with at least a pair of travel records; and wherein the communication component is further configured to, in response to determining a customer match and a trip match, communicate at least a portion of the travel record received from a publisher for the customer to the subscriber without disclosing any of the protected data elements between the publisher and the subscriber.

28. The system of claim 1, wherein the communication component is further configured to receive a request from a customer to delete said customer from the system, the request including one or more protected data elements, and in response to receiving said request:
 the normalization component is configured to tokenize the protected data elements into a plurality of tokens,
 the cryptographic component is configured to hash each customer protected data element using the system hash key, and hash each travel provider protected data element using a provider hash key selected based on which travel provider created the travel provider protected data element,
 the matching component is configured to determine a customer match by comparing the tokenized, hashed protected data elements provided by said customer to previously received tokenized, hashed protected data elements to identify the customer within the system, and
 in response to determining a customer match, the storage component is configured to delete the protected data elements corresponding to said customer in response to said customer's request.

29. The system of claim 1, wherein the communications component is further configured to receive permissions from the plurality of publishers regarding the elements of customer travel records that are permitted to be shared with subscribers, and is further configured to selectively communicate elements of customer travel records to subscribers based on the permissions.

30. A cryptographically enforced data exchange for enabling an exchange of customer travel records between a plurality of travel providers while preserving customer privacy, the system comprising:
 a communication component configured to receive customer travel data from each of a plurality of publishers, wherein each publisher is a travel provider;
 wherein the customer travel data includes one or more protected data elements identifying a customer, and one or more travel records associated with a travel itinerary for such customer;
 wherein the protected data elements include customer protected data elements and travel provider protected data elements;
 the communication component further configured to receive from a subscriber a request to receive publisher provided travel records for a subscriber's customer, the request including protected data elements identifying such subscriber's customer;

a normalization component configured to, in real-time, tokenize the protected data elements into a plurality of tokens;

a cryptographic component configured to, in real-time, hash each customer protected data element using a system hash key, and hash each travel provider protected data elements using a provider hash key selected based on which travel provider created the travel provider protected data element;

wherein a provider hash key is provided for each travel provider;

a storage component being a cryptographically enforced data store configured to receive and store the tokenized, hashed protected data elements and the travel records;

a matching component configured to, in response to receiving customer travel data, determine a customer match by comparing the tokenized, hashed protected data elements to previously received tokenized, hashed protected data elements to match a customer with a previously identified customer, and, in response to determining a customer match, determine a trip match based on a comparison of at least one of a time, a date, and a location associated with at least a pair of travel records for the matched customer;

wherein the communication component is further configured to, in response to determining a customer match and a trip match between customer travel data received from one or more of the plurality of publishers and the subscriber's customer, communicate at least a portion of the travel record received from the publisher for the customer to the subscriber without disclosing any of the protected data elements between the publisher and the subscriber thereby preserving customer privacy.

* * * * *